United States Patent
Teicher et al.

(10) Patent No.: US 6,554,439 B1
(45) Date of Patent: Apr. 29, 2003

(54) ILLUMINATION APPARATUS FOR SIMULATING DYNAMIC LIGHT CONDITIONS

(75) Inventors: Martin H. Teicher, Waltham, MA (US); Steven B. Lowen, Burlington, MA (US)

(73) Assignee: The McLean Hospital, Belmont, MA (US)

( * ) Notice: Subject to any disclaimer, the term of this patent is extended or adjusted under 35 U.S.C. 154(b) by 0 days.

(21) Appl. No.: 09/570,966

(22) Filed: May 15, 2000

(51) Int. Cl.[7] ................................. F21V 9/02
(52) U.S. Cl. .................. 362/2; 362/231; 362/276; 362/293; 315/360; 607/88
(58) Field of Search ............................. 362/1, 21, 234, 362/231, 276, 293; 315/155, 360; 600/27; 607/88, 95

(56) References Cited

U.S. PATENT DOCUMENTS

| | | |
|---|---|---|
| 3,986,022 A | 10/1976 | Hyatt |
| 4,074,124 A | 2/1978 | Maute et al. |
| 4,091,441 A | 5/1978 | Ott .................................. 362/1 |
| 5,259,380 A | 11/1993 | Mendes et al. |
| 5,343,121 A | 8/1994 | Terman et al. |
| 5,441,531 A | 8/1995 | Zarate et al. |
| 5,589,741 A | 12/1996 | Terman et al. |
| 5,645,578 A | 7/1997 | Daffer et al. |
| 5,749,646 A | 5/1998 | Brittell |
| 5,782,895 A | 7/1998 | Zarate et al. |
| 5,793,781 A | 8/1998 | Lawandy |
| 5,824,024 A | 10/1998 | Dial |
| 5,849,027 A | 12/1998 | Gart et al. |
| 5,961,201 A | 10/1999 | Gismondi .................. 362/233 |

*Primary Examiner*—Stephen Husar
(74) *Attorney, Agent, or Firm*—Clark & Elbing, LLP

(57) ABSTRACT

An apparatus for generating artificial light that closely simulates the intensity and spectrum of natural light and other dynamic light conditions. The apparatus includes a collection of light sources of various colors which are controlled by a computer. Attached to the computer is a sensor that measures the spectral qualities of the light produced by the light sources. The sensor sends this information to the computer which then adjusts the light sources to generate the desired light conditions.

21 Claims, 1 Drawing Sheet

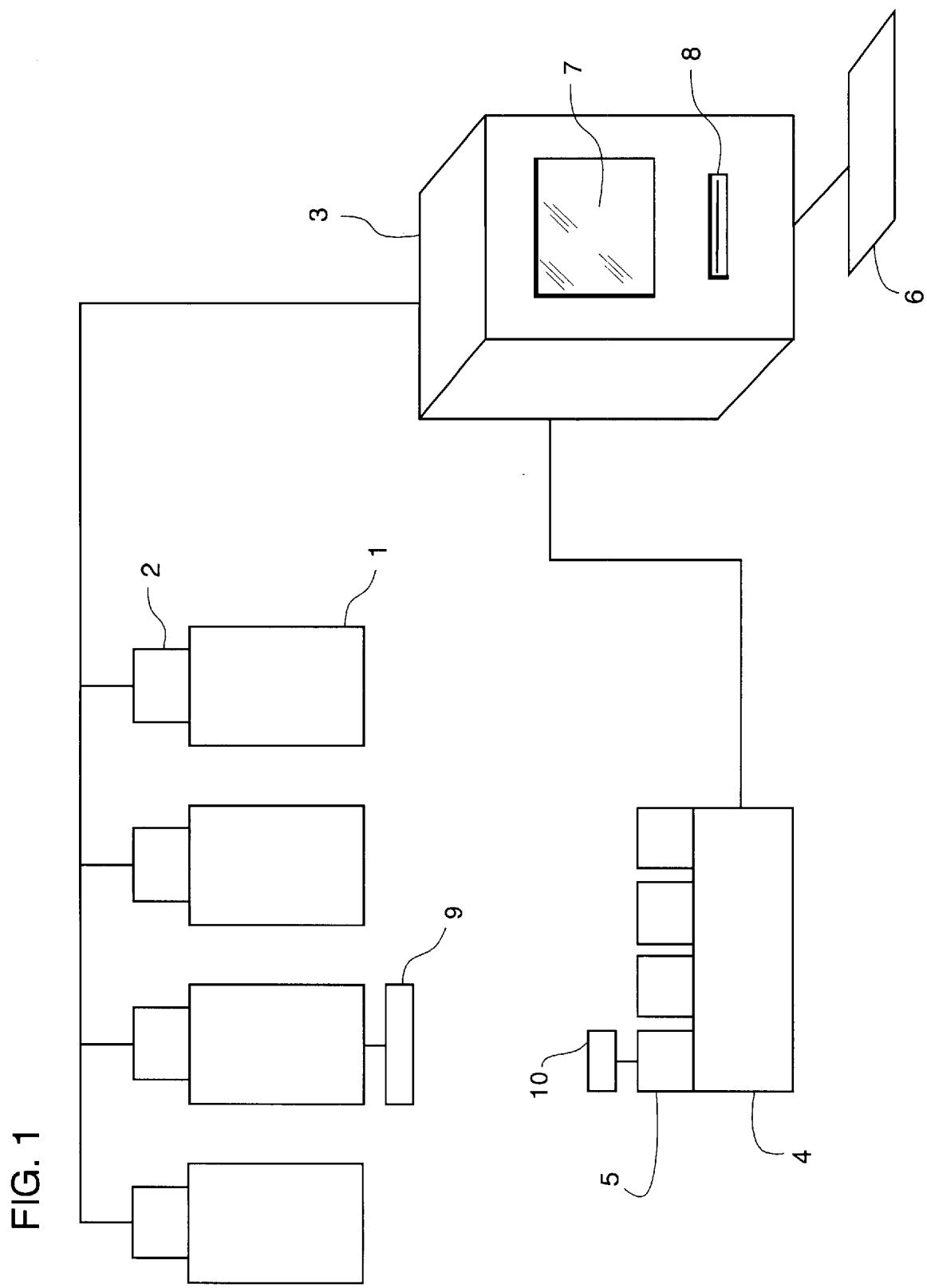

ILLUMINATION APPARATUS FOR SIMULATING DYNAMIC LIGHT CONDITIONS

BACKGROUND OF THE INVENTION

The present invention relates to systems for simulating light conditions.

Humans and other animals live under conditions of natural illumination. Natural light is a dynamic light condition that exhibits daily and seasonal changes in intensity, color spectrum, and duration. Many species of plants, animals, and microorganisms have biological processes that are attuned to environmental illumination patterns and lighting conditions. It is well known that changes in these illumination patterns and lighting conditions can have significant physiological and behavioral effects. For instance, the seasonal growth and reproduction cycles of many plant species are tied to seasonal changes in natural light conditions. Some plants, for example, that always flower at a specific time of year are sensitive to the photoperiod, the relative lengths of night and day, and use this to determine when to flower.

Changes in illumination patterns and lighting conditions can also have dramatic effects on the physiology, psychology, and mood of humans. For instance, in certain geographical areas, an estimated 20% of the human population may be affected by winter depression, or seasonal affective disorder ("SAD"), a condition associated with reduced exposure to natural light during the winter season. Symptoms of this disorder can include fatigue, depression, and changes in appetite and sleep patterns. Recent research has revealed that extended exposure to bright light can help alleviate many of the symptoms of SAD in some patients.

Most living creatures, including humans, have an internal biological clock that controls many life functions in rhythmic patterns, which include 24-hour patterns known as circadian rhythms. These biological rhythms help to regulate a wide variety of biological processes. A number of maladies, such as jet lag, certain mood disorders, and sleep disorders, are associated with a disruption in these intrinsic rhythms. Since environmental illumination patterns are believed to play a role in regulating the internal clock of humans and other organisms, various forms of light therapy have been used to treat many of these conditions.

Many of the artificial indoor lighting conditions that are commonly encountered in modern society are arbitrary and bear little relationship to natural light conditions. It is believed that certain artificial lighting conditions may have an adverse effect on the natural biological rhythms that influence human behavior. These effects are likely to be particularly pronounced when individuals spend prolonged periods of time in windowless interiors where there is little or no exposure to natural light conditions. Although little is presently known about the impact that arbitrary artificial lighting conditions may have on long term human performance and productivity, in many instances human health, comfort, and psychological well-being may well be enhanced by providing lighting conditions that more closely mimic the patterns, intensity, and spectrum of natural light.

Previous attempts have been made to develop illumination devices that simulate natural light conditions. For example, Maute et al. in U.S. Pat. No. 4,074,124 describe an illumination apparatus that uses an artificial light source concealed by shutters. As the shutters gradually open they expose increasingly larger portions of the light source, thereby simulating dawn and morning light conditions. Conversely, as the shutters close, they gradually conceal increasingly larger portions of the light source, thereby simulating afternoon and dusk conditions. Daffer et al. in U.S. Pat. No. 5,645,578 disclose a sauna bed that is capable of simulating the intensity and direction of natural light at mid-day. Colored lights and a strobe light located in the hood of the sauna bed provide alternative lighting regimes. Terman et al. in U.S. Pat. Nos. 5,343,121 and 5,589,741 describe a system that produces variable intensity illumination cycles that can be programmed to correspond to naturally occurring illumination cycles. Gart et al. in U.S. Pat. No. 5,849,027 disclose an apparatus that delivers optical light energy for the therapeutic treatment of various dermatological and internal diseases. The device includes lenses, filters, fiber optics, and power control elements to regulate the intensity and frequency of the light energy being applied to the patient. Recently, Dial in U.S. Pat. No. 5,824,024 described a compact illumination apparatus for treating light deficiency and mood disorders that utilizes neon fixtures. The apparatus employs multiple colored tubes, dimmers, and timers to simulate natural lighting conditions, such as sunrise and sunset.

Illumination devices that provide controlled exposure to bright light or that attempt to simulate natural light conditions have been used to treat a variety of physical and psychological disorders, including SAD, jet lag, sleep disorders, circadian abnormalities, and the like. Such devices have also been used in research laboratories to study the effects of environmental illumination patterns in a wide range fields, including animal behavior and plant physiology.

SUMMARY OF THE INVENTION

The present invention features an apparatus and method for generating artificial light that mimics a dynamic light condition. The apparatus includes (a) multiple illumination sources that emit light of different wavelengths; (b) a means for detecting the spectral characteristics of the sum of the emitted light and transmitting this information to a computer; and (c) a means for sending control signals from the computer to the illumination sources to control the intensity of illumination from a plurality of the illumination sources to alter the spectral characteristics of the emitted light so that the light mimics the desired dynamic light condition over time. In one embodiment, the dynamic light condition that the apparatus mimics is natural light.

In a preferred embodiment, the apparatus includes sources of white, blue, yellow, and red light. It also includes an electronic driver capable of translating low-level control signals generated by standard computer peripherals into high-power signals for directly controlling the illumination sources. The means for detecting spectral characteristics of the emitted light includes a collection of photocells and filters. The computer is preferably a stand-alone personal computer.

The invention can be used to treat a variety of light-sensitive psychological disorders, including SAD, depression, sleep disorders, jet lag, chronobiological disorders, and circadian rhythm disorders. It can also be used to alter natural animal behavior, including facilitating or inhibiting seasonal behaviors such as mating. In another embodiment, the invention can be used to facilitate, inhibit or otherwise modify cycles of plant growth, flowering, or fruit production.

The present invention is able to simulate all of the gradual changes in intensity, spectrum, and duration exhibited by natural light at different times of the day and year, and at different locations on the planet, thereby mimicking the dynamic qualities of natural light. It has a wide range of potential applications, including use in the work-place, research situations, hospitals, industry, and in the home.

Other features and advantages of the invention will be apparent from the following description of the preferred embodiments thereof and from the claims.

BRIEF DESCRIPTION OF THE DRAWING

FIG. 1 is a schematic block diagram illustrating one embodiment of the invention.

DETAILED DESCRIPTION

A preferred embodiment of the present invention is shown in FIG. 1. The system includes an array of illumination sources 1 of different colors. The illumination sources 1 may be incandescent (standard or halogen), fluorescent, or other types of lamps capable of producing variable illumination levels. Each lamp includes a power supply and a means for generating light energy in the visible or near visible range (i.e., wavelengths ranging from about 350 nm to about 700 nm). The means for generating light energy in each source may be an appropriate bulb of conventional design and may include multiple bulbs if greater power is required. The bulbs should be large enough to generate power output in the range of 20 to 500 watts, or higher if needed, for incandescent illumination sources. The power output needed may be less for other types of illumination sources.

Preferably, one of the illumination sources 1 emits white light, and the others a variety of colored light. Different colors of light can be produced using filters that allow only light within a selected range of wavelengths to be seen. Alternatively, the bulb of the illumination source 1 may be coated with an appropriate substance to produce colored light within a particular wavelength range. Suitable wavelengths include wavelengths ranging from about 470–500 nm (in the blue range); from about 500–550 nm (in the green range); from about 550–600 (in the yellow range); and from about 600–670 nm (in the red range). Purple/violet (i.e., wavelengths in the range of about 350–470 nm), orange, and other colors may also be used. Thus, the array may include, for example, a 500 W halogen incandescent lamp, a 100 W halogen incandescent lamp with a blue filter, a 100 W incandescent lamp with a yellow filter, and a 100 W incandescent lamp with a red filter.

Each illumination source 1 is operated by an electronic driver 2 that controls the intensity of the light output. The driver 2 is connected to and under the control of a computer 3. The electronic driver 2 is capable of translating low-level control signals generated by standard computer peripherals into high-power signals for directly controlling each illumination source. This can be accomplished using an optoisolater, a diode bridge, SCR, and associated trigger circuitry. Other well known methods may alternatively be used. Generally, there is one driver for each light source. The drivers may be separate from each other or they may all be located together within a single housing.

Also connected to the computer is a sensor array 4, which includes a collection of photocells 5 with appropriate filters 10. The sensor array 4 senses the intensity and spectral qualities of the light produced by the array of illumination sources 1, and sends the information to the computer 3, which is programmed to adjust the light output of the illumination sources 1 to match the desired illumination conditions. In one preferred embodiment, the system generates variable natural spectral light using one or more rotating filters 9 and utilizes complex filters having the spectral properties of natural light at different times of the day that can be positioned by the computer 3.

The computer 3 can be a stand-alone personal computer, preferably with high computational capacity microprocessors. Alternatively, a minicomputer or mainframe computer can be used. The computer 3 has a keyboard 6 that receives input from the user, allowing the user to select any of a variety of different illumination conditions. The computer 3 also includes a monitor 7 that displays information, including a description of the illumination conditions currently being simulated. The computer 3 also has a disc drive 8 into which the software that controls the array of illumination sources 1 is loaded.

The software also permits the computer 3 to utilize the incoming information from the sensor array 4 to test and calibrate the illumination sources 1, and control the intensity of each different-colored illumination source to generate the desired illumination pattern over time. The system may be calibrated by placing the sensor array 4 near where the subject will be located. Other sources of illumination are reduced (to zero, if possible), and in any case are held constant. The computer 3 then applies a very small power level to the first illumination source, waits a suitable amount of time (up to about one second for incandescent illumination sources, generally less for other types) for the emitted light levels to reach equilibrium, and stores the values generated by the sensor array 4. The computer 3 then applies a sequence of successively increasing power levels, each slightly larger than the one before, storing the sensor values for each power level. The process is repeated for each bulb.

In a preferred embodiment, the software program is capable of setting natural illumination patterns corresponding to a selected date and time, as well as geographic and atmospheric conditions. For a given time of day, day of year, and location on the planet, standard techniques yield the position of the sun in the sky. Interaction with known atmospheric properties yields the desired spectrum. This can be modified to incorporate different atmospheric effects known to exist at different places or times. Given the desired light output thus generated, power levels to the individual illumination sources are preferably determined by a nonlinear least-squares algorithm, such as the Levenberg-Marquardt method.

The system of the invention provides independent, gradual, and continuous control of light spectrum and intensity over time. The apparatus can simulate the light conditions corresponding to any location on the planet at any time of day on any day of the year, as well as the changes that occur in natural light conditions over the course of a day, and over the course of a year. The system can be adapted for the treatment of a variety of physical and psychological conditions, including SAD and other mood disorders, jet lag, sleep disorders, stress, visual disorders, and circadian abnormalities.

The exact natural light condition to be simulated by the apparatus will vary depending upon the condition being treated. For example, a traveler can, before traveling, adjust to the lighting conditions of a remote destination by gradually shifting present lighting conditions to match those of the destination. This could counteract the symptoms of jet-lag by reducing the adverse effects caused by a sudden shift in local time. Similarly, an individual suffering from SAD resulting from winter-time lighting conditions could be gradually shifted to light conditions that mimic the spring and summer months.

The invention is also useful as a scientific research tool. Researchers studying the effects of natural illumination patterns on various organisms can use the system to provide the desired lighting conditions in a laboratory setting. This would allow researchers, for example, to study the effects of summer-time illumination conditions on a selected biological system at any time of the year.

The present invention also has agricultural and veterinary applications. It can be used, for example, to facilitate natural seasonal cycles in plant growth, flowering, and fruit production; or to generate modified cycles. It can also facilitate or inhibit certain seasonal behaviors, e.g. mating in zoo animals, by simulating season-specific illumination patterns.

In the office or at home, the system of the invention can be used to provide naturalistic light that is more comfortable and aesthetically pleasing than other forms of artificial light. The apparatus is particularly useful in interior rooms and other enclosed spaces that do not normally receive exposure to natural light conditions.

Although the present invention has been described with reference to preferred embodiments, one skilled in the art can easily ascertain the essential characteristics of the present invention, and without departing from the spirit and scope thereof, can make various changes and modifications of the invention to adapt it to various usages and conditions. All publications and patents mentioned in this specification are herein incorporated by reference.

What is claimed is:

1. An apparatus for generating artificial light that mimics a desired dynamic light condition, comprising:
    (a) multiple illumination sources emitting light of different wavelengths;
    (b) means for detecting spectral characteristics of the sum of said emitted light and transmitting said characteristics to a computer; and
    (c) means for sending control signals from said computer to said illumination sources to control the intensity of illumination from a plurality of said illumination sources to alter said spectral characteristics so that the light mimics the desired dynamic light condition over time.

2. The apparatus of claim 1, wherein said dynamic light condition is natural light.

3. The apparatus of claim 1, wherein said illumination sources comprise a white light source, a blue light source, a yellow light source, and a red light source.

4. The apparatus of claim 1, wherein said means for detecting spectral characteristics comprises a collection of photocells.

5. The apparatus of claim 1, wherein said computer is a stand-alone personal computer.

6. The apparatus of claim 1, wherein said apparatus further comprises an electronic driver capable of translating low-level control signals generated by standard computer peripherals into high-power signals for directly controlling said illumination sources.

7. The apparatus of claim 1, wherein said illumination sources further comprise at least one rotating filter.

8. The apparatus of claim 4, wherein said means for detecting spectral characteristics further comprises a collection of filters.

9. A method for delivering artificial light that mimics a dynamic light condition comprising the following steps:
    (a) emitting light of different wavelengths from multiple illumination sources;
    (b) detecting spectral characteristics of the sum of said emitted light and transmitting said characteristics to a computer;
    (c) sending control signals from said computer to said illumination sources to control the intensity of illumination from a plurality of said illumination sources; and
    (d) altering said spectral characteristics so that the light mimics the dynamic light condition over time.

10. The method of claim 9, wherein said dynamic light condition is natural light.

11. The method of claim 9, wherein said light is used to alter natural patterns of animal behavior.

12. The method of claim 9, wherein said light is used to facilitate seasonal behavior in animals.

13. The method of claim 12, wherein said seasonal behavior is mating.

14. The method of claim 9, wherein said light is used to inhibit seasonal behavior in animals.

15. The method of claim 9, wherein said light is used to modify seasonal behavior in animals.

16. The method of claim 9, wherein said light is used to treat a light-sensitive psychological disorder.

17. The method of claim 16, wherein said psychological disorder is selected from the group consisting of SAD, depression, sleep disorders, jet lag, chronobiologic disorders, and circadian rhythm disorders.

18. The method of claim 9, wherein said light is used to facilitate natural cycles of plant growth, flowering, or fruit production.

19. The method of claim 9, wherein said light is used to inhibit natural cycles of plant growth, flowering, or fruit production.

20. The method of claim 9, wherein said light is used to modify cycles of plant growth, flowering or fruit production.

21. A method for calibrating an illumination device comprising the following steps:
    (a) applying a power level to an illumination source of said illumination device so that the illumination source emits light;
    (b) allowing the level of emitted light to reach equilibrium;
    (c) detecting intensity or spectral characteristics of said emitted light;
    (d) storing said characteristics of said emitted light;
    (e) increasing said power level and repeating steps (a) through (d); and
    (f) repeating steps (a) through (e) for each illumination source of said illumination device.

* * * * *